United States Patent [19]

Davenport et al.

[11] Patent Number: 4,930,049
[45] Date of Patent: May 29, 1990

[54] OPTICAL MULTIPLEXED ELECTRICAL DISTRIBUTION SYSTEM PARTICULARLY SUITED FOR VEHICLES

[75] Inventors: John M. Davenport, Lyndhurst; Richard L. Hansler, Pepper Pike, both of Ohio

[73] Assignee: General Electric Company, Schenectady, N.Y.

[21] Appl. No.: 290,005

[22] Filed: Dec. 27, 1988

[51] Int. Cl.$^5$ .......................... F21V 7/04; G02F 1/00
[52] U.S. Cl. .................................. 362/32; 307/10.8; 340/825; 350/96.1; 362/23; 362/26; 362/29; 362/61; 362/80; 455/603
[58] Field of Search ........................ 362/23, 26, 29, 32, 362/61, 80; 455/603; 340/825; 307/10 R; 250/227; 350/96.1

[56] References Cited

U.S. PATENT DOCUMENTS

| | | |
|---|---|---|
| 4,280,062 | 7/1981 | Miller . |
| 4,385,344 | 5/1983 | Gonser . |
| 4,389,698 | 6/1983 | Cibie . |
| 4,449,244 | 5/1984 | Kopainsky ........................ 455/603 |
| 4,501,021 | 2/1985 | Weiss . |
| 4,519,250 | 5/1985 | Sumino ............................. 455/603 |
| 4,584,487 | 4/1986 | Hesse . |
| 4,613,927 | 9/1986 | Brandt . |
| 4,616,224 | 10/1986 | Reighard ........................... 455/603 |
| 4,700,061 | 10/1987 | Ishikawa ........................... 250/227 |
| 4,704,660 | 11/1987 | Robbins . |
| 4,707,823 | 11/1987 | Holdren . |
| 4,726,644 | 2/1988 | Mathis . |
| 4,739,183 | 4/1988 | Tokura . |
| 4,740,870 | 4/1988 | Moore . |
| 4,745,525 | 5/1988 | Sheehy . |
| 4,809,177 | 2/1989 | Windle . |
| 4,811,172 | 3/1989 | Davenport . |
| 4,826,273 | 5/1989 | Tinder . |
| 4,831,278 | 5/1989 | Ueda . |
| 4,851,969 | 7/1989 | Davenport ........................... 362/61 |

OTHER PUBLICATIONS

Design News, "Optical Fibers Untangle Wiring Maze" p. 38, 1988.

Primary Examiner—Douglas Hart
Attorney, Agent, or Firm—John P. McMahon; Stanley C. Corwin; Fred Jacob

[57] ABSTRACT

A multiplexed transmission scheme that reduces the complexity of the normal electrical wiring harness of a vehicle is disclosed. The system directly routes electrical excitation to motorize devices and multiplexes the control of the motorized devices along with the control of lighting devices by means of an optical transmission scheme having a high intensity light source as its source of light energy. Various devices are disclosed that interface with a control buss, light busses, and power buss all related to the multiplexed system. Further disclosed are related optical devices that allow the operator of a vehicle to provide commands to the multiplexed transmission scheme so as to provide control of all of the operator selected electrical devices of the vehicle.

36 Claims, 17 Drawing Sheets

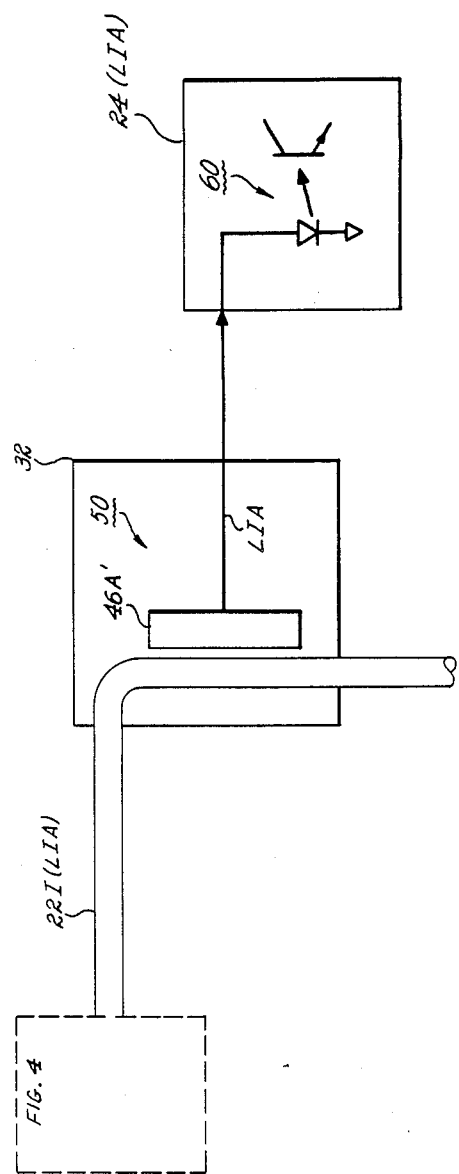

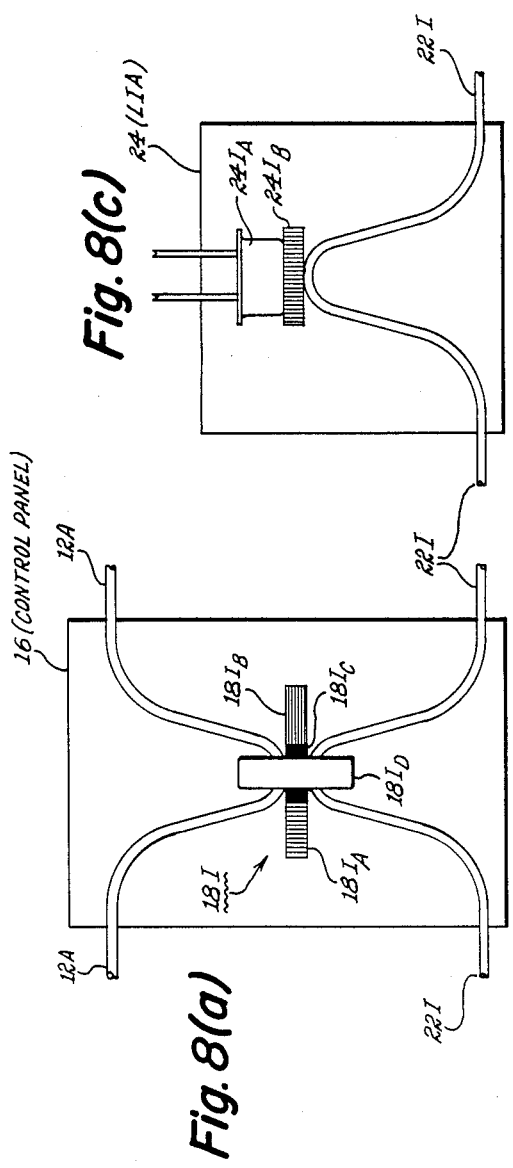
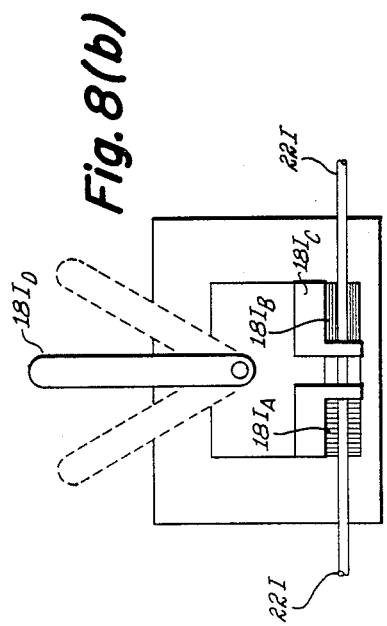

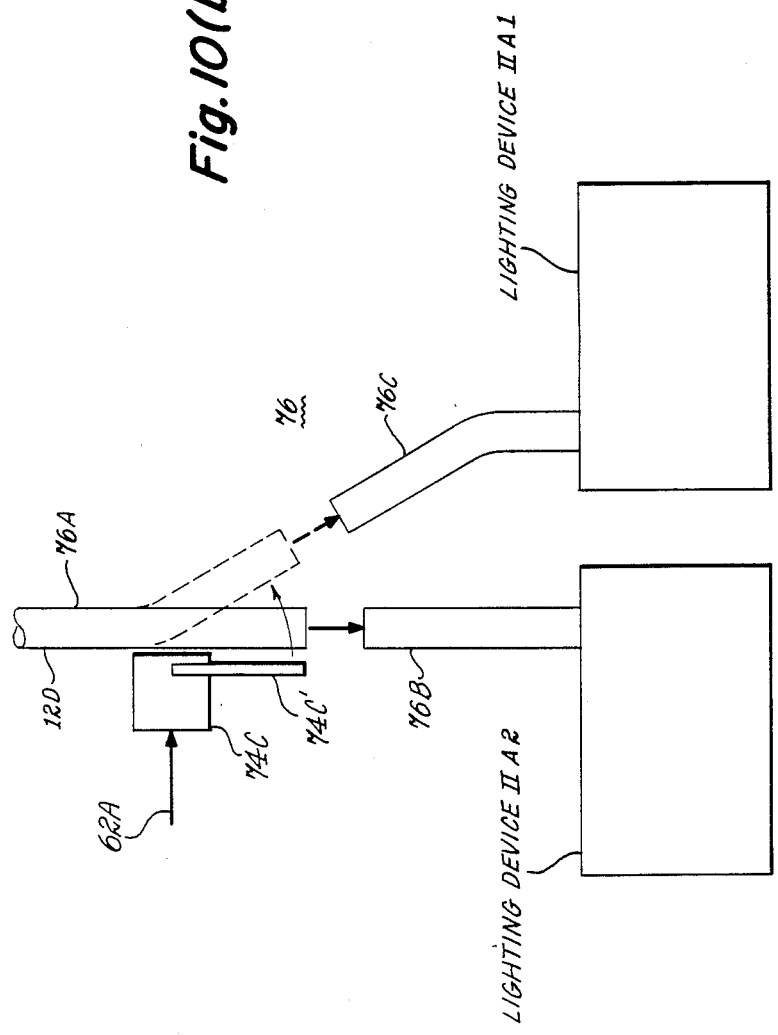

4,930,049

OPTICAL MULTIPLEXED ELECTRICAL DISTRIBUTION SYSTEM PARTICULARLY SUITED FOR VEHICLES

CROSS REFERENCE TO RELATED APPLICATION

U.S. patent application Ser. No. 290,006, now U.S. Pat. No. 4,851,969 filed concurrently herewith is related to the present invention.

BACKGROUND OF THE INVENTION

The present invention relates to an electrical distribution system for a vehicle, and more particularly, to an optical multiplexed distribution system that reduces the complexity of the electrical wiring harness of a vehicle.

As discussed in U.S. patent application Ser. No. 123,844, filed Nov. 23, 1987, now U.S. Pat. No. 4,811,172 and assigned to same assignee as a present invention, it is known that fiber optics may be used efficiently to carry the output of a light source to various locations without encountering any substantial transmission losses thereof. The optical fibers in cooperation with a high brightness light source finds various related space restricted applications such as encountered for aerodynamically styled vehicles.

Similarly, as disclosed in U.S. patent application Ser. No. 266,129, filed Nov. 2, 1988, a centralized lighting system which is particularly suited for vehicles comprises an integrated high brightness light source which is coupled to optical light guides and serves the lighting needs of the vehicle.

While the above two (2) disclosures provide light generating and distribution systems for a vehicle, there still remains a need to reduce the complexity of the light generating and distribution system, along with the overall electrical distribution system, in particular, the wiring harness related to the electrical needs of the vehicle. Some of the problems that create the complexity of the electrical distribution system of a vehicle, is that the switches for illuminating or motorizing devices that may be activated by a driver must be located in a convenient location while the function being switched may be physically and visibly quite remote and possibly in a number of locations. For example, the emergency flashers of a vehicle are commonly activated from the steering column, but the related blinker devices activate at least four (4) lamps on and off that are located on the front and rear of the vehicle. The circuit to accomplish this function is further complicated by the fact that the same four (4) lamps are also used to provide turn signals and, in some cases, the related lamps are also used as brake lights. A similar complication exists with regard to the electrically activated devices, such as, door locks being located on individual doors for selectability while the overall control may be on a panel within the direct reach of the driver. As a result of these complexities, the wiring harness for a vehicle is a relatively complex arrangement having the need for simplification.

Accordingly, it is an object of the present invention to provide a control system that reduces the complexity of the related wiring harness for illuminating and electrically activated devices of a vehicle.

SUMMARY OF THE INVENTION

The present invention is directed to a multiplexed control scheme that reduces the complexity of the electrical distribution system of a vehicle.

The control system comprises a light source, a power source, a control buss, light busses and a power buss. The control system further comprises at least one control panel, various control logic, control buss interfacing devices, light buss interfacing devices and power buss interfacing devices.

The light source generates light energy for a plurality of the light busses which are routed within the vehicle. The power source by means of the power buss is routed to and provides electrical energy to operator controlled electrically activated devices of the vehicle. The at least one control panel is connected to one of the light busses and is responsive to a plurality of operator initiated commands for controlling the electrically activated devices along with lighting devices of a vehicle. The control panel is also responsive to operator initiated commands, such as turn signal devices, signaling the forthcoming motion of the vehicle. The control panel generates a plurality of output signals each respectively representative of the operator initiated commands. The control logic is responsive to the output signals of the control panel and generates corresponding control signals onto a control buss routed throughout the vehicle. The electrically activated devices and the lighting devices are each provided with a device to mate into and communicate with the control buss. Each of the control buss interfacing devices responds to the respective output signals of the control logic related to the electrically activated devices and the lighting devices. A device is provided for respectively interfacing each of the lighting devices with an associated light buss. Each of the lighting buss interface devices couples its respective lighting device to its light buss in response to a corresponding output signal from the respective control buss interfacing device. A device is provided for respectively interfacing each of the electrically activated devices with the power buss. Each of the power buss interfacing devices is coupled to respective electrically activated devices in response to a respective output signal from its respective control buss interfacing device.

BRIEF DESCRIPTION OF THE DRAWING

FIGS. 5(a) and 5(b) are respectively a schematic block diagram and a schematic arrangement of a control buss interface device related to the control logic of FIGS. 4(a) and 4(b).

FIGS. 8(a) and 8(b) and 8(c) are schematic block diagrams of one embodiment of initiating and color coding a control signal which is applied to the control buss and responded to by a lighting buss interfacing device.

FIGS. 10(a) and 10(b) are respectively a block diagram schematic and a schematic arrangement of a second lighting buss interface device related to the present invention.

DETAILED DESCRIPTION OF THE PREFERRED EMBODIMENTS

Figure 1:
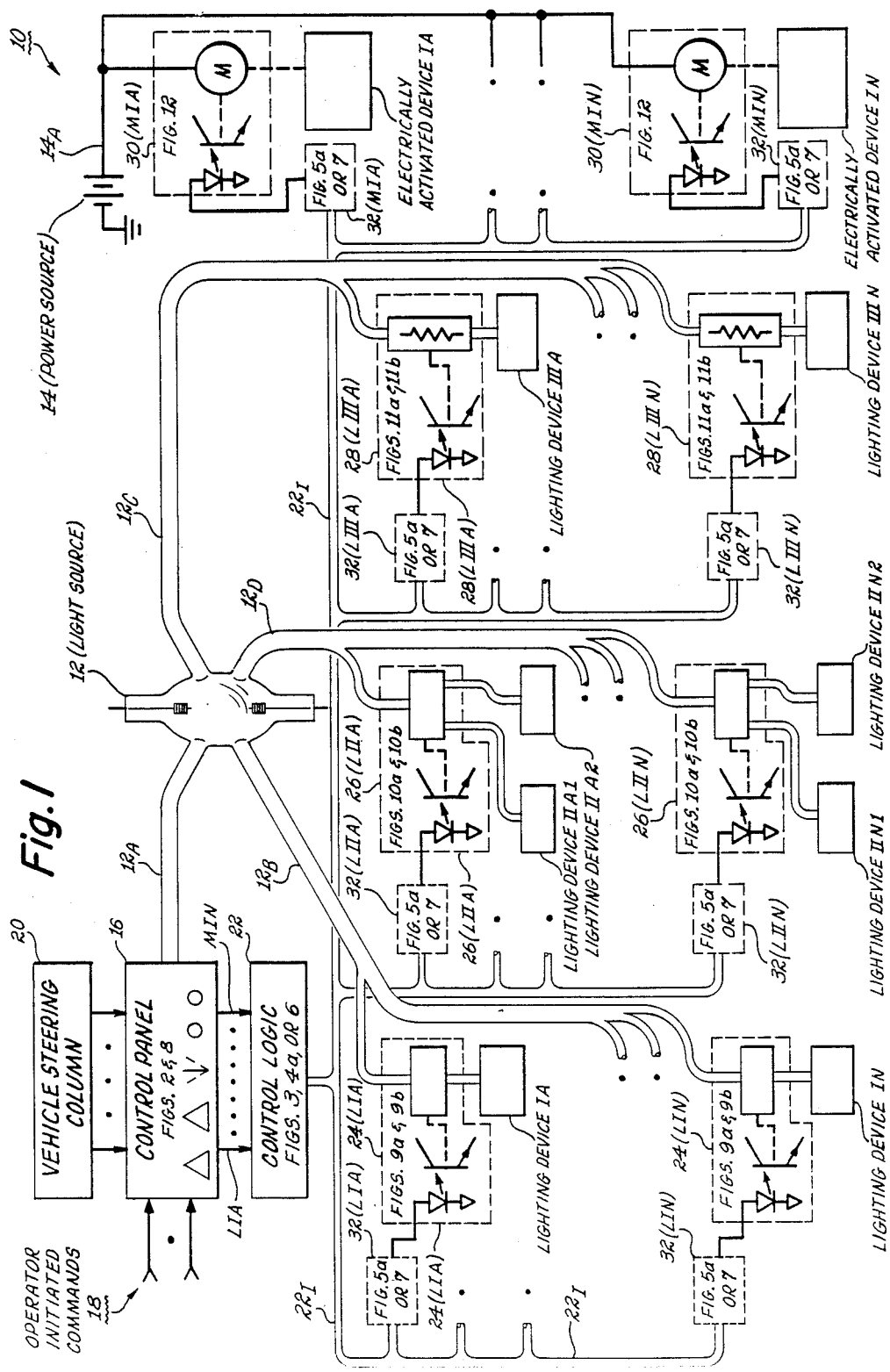
FIG. 1 is a block diagram of the multiplexed control system for a vehicle according to the present invention.

Referring to the drawing, FIG. 1 is a block diagram of the multiplexed control system 10 particularly suited for a vehicle. The system 10 comprises a light source 12, a power source 14, and at least one control panel 16.

The light source 12 may be of the type described in the aforementioned U.S. patent application Ser. No. 266,129 filed Nov. 2, 1988. The light source 12 is centrally located within the vehicle and of a high brightness level more than sufficient to provide all of the illumination needs of the vehicle. The light source 12 generates light energy for a plurality of light busses which are routed within vehicle and provide the light energy for vehicle lighting devices. For the embodiment shown in FIG. 1, the light source 12 has four (4) separate light busses shown as 12A (light buss A), 12B (light buss B), 12C (light buss C), and 12D (light buss D). The light busses 12A, 12B, 12C, and 12D are respectively routed to the at least one control panel 16, and interface devices 24, 26, and 28.

The power source 14, illustrated as a typical automotive battery, provides the excitation that is applied to power buss 14A which is routed to and provides electrical energy to electrically activated devices of the vehicle related to the present invention and which are under control of the operator initiated responses selectable from the control panel 16. The control panel 16 is also responsive to operator initiated commands signifying the forthcoming motion of the vehicle such as stop, turn and brake commands typically initiated from or near the steering column 20 of the vehicle. The at least one control panel 16 generates a plurality of output signals LIA ... MIN each respectively representative of the operator initiated commands. Control logic 22 is responsive to the output signals LIA ... MIN and generates corresponding control signals onto a control buss 22I, having various embodiments to be described.

A device 32 is provided for respectively interfacing each of the electrically activated devices and each of the lighting devices with the control buss 22I. Each of these control buss interfacing devices 32 responds to the corresponding respective output signal related to the electrically activated devices or the lighting devices, which, in turn, generate output signals in response thereto.

Devices 24, 26 and 28 respectively interface each of the lighting devices with a related light buss. Each of the light buss interfacing device 24, 26 and 28 couples the related lighting device to the related light buss in response to the respective output signal from the corresponding control buss interfacing device. The device 30 provides for respectively interfacing each of the electrically activated devices with the power buss 14A. Each of these power buss interfacing devices couples its respective electrically activated device to the power buss in response to respective output signals from the corresponding control buss interfacing device.

Figure 2:
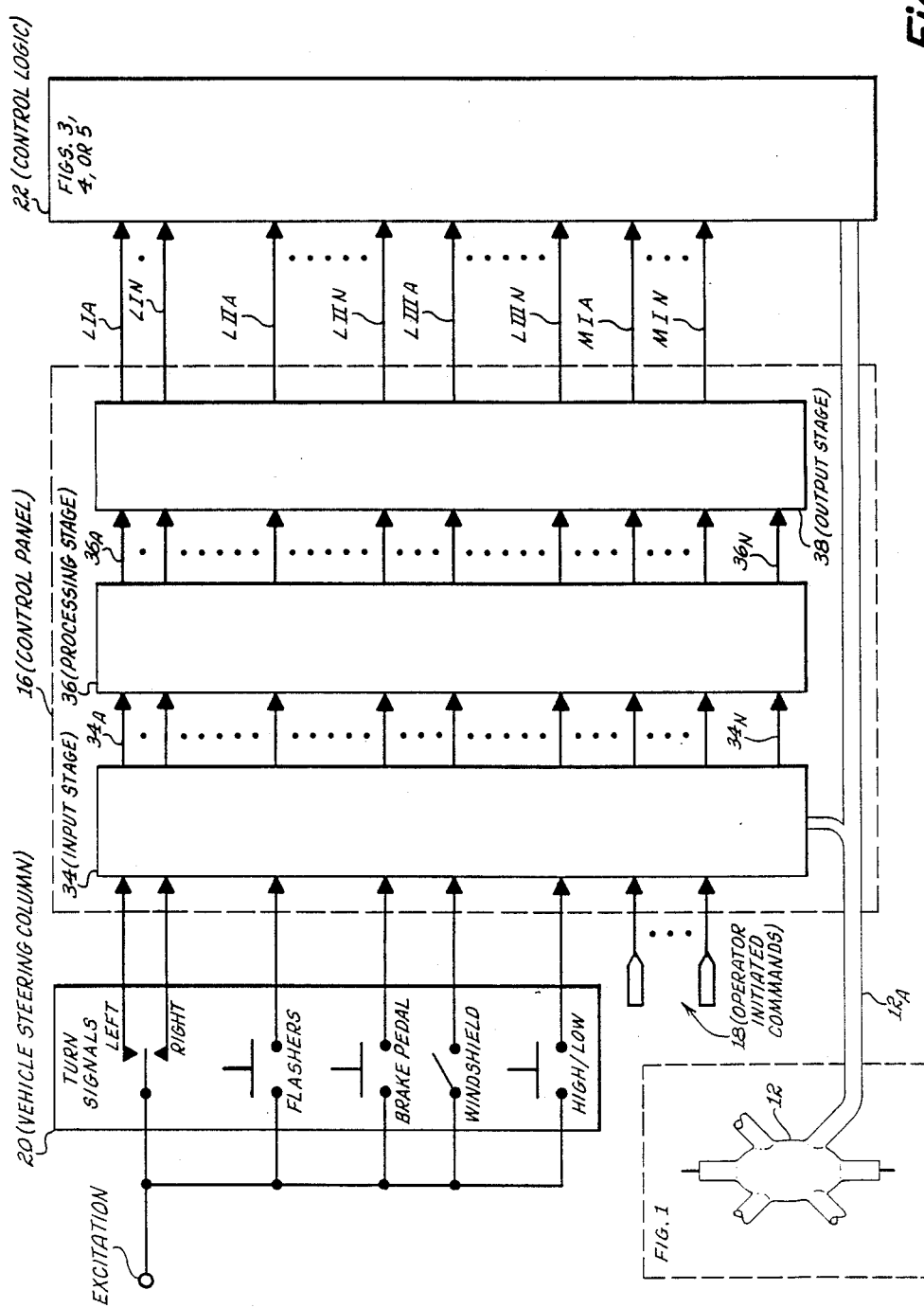
FIG. 2 is a block diagram generally illustrating the interconnections of the external devices under operator control of one embodiment of at least one control panel related to the present invention.

The at least one control panel 16 has various embodiments one of which is shown in FIG. 2 and may be conveniently located relative to the operator of the vehicle. Other control panels may be distributed within the vehicle and positioned at the same location of the electrically activated devices or lighting devices; e.g., at the door or doors where the door locks are located. The control or the displays of one or more control panels are typically associated with lighting devices, electrically activated devices and sensors and some of which are given in Table 1.

TABLE 1

LIGHTING DEVICES
LAMPS
HEADLAMPS ON-OFF
HEADLAMPS HIGH-LOW
PARKING
TURN SIGNAL
CORNERING
FLASHERS
STOP
BACKING
DOME
GLOVE
COURTESY
ELECTRICALLY ACTIVATED
DEVICES
WIPERS MIST, LOW, HIGH
WASHERS
MIRRORS
LOCKS - DRIVERS DOOR AND EACH DOOR
COMBINATION LOCK - DRIVERS DOOR AND EACH DOOR
WINDOWS - DRIVERS DOOR AND EACH DOOR
TRUNK LATCH
HEATER FAN
CRUISE CONTROL
AIR CONDITIONING
RADIO
SENSORS
GAS
OIL PRESSURE
OIL LEVEL
SPEED
RPM
WATER TEMP
WATER LEVEL
WASHER FLUID
BATTERY ACID
DOOR OPEN-DOME LIGHT-COURTESY LIGHT-WARNING CHIME
KEY LEFT WARNING-WARNING CHIME
HEADLIGHT ON WARNING-WARNING CHIME

The activation of the associated equipment given in Table 1 may be accomplished in various manners one of which is that the courtesy and dome lights may be operated electrically and come on when any door of the vehicle is opened. The light source 12 coupled to light buss 12A, which is connected to control panel 16, may be activated when the key of the vehicle is placed into the keyhole on the steering column.

The control panel 16 of FIG. 2 has an input stage 34 supplied, in part, from light buss 12A and which is responsive to the operator initiated commands 18. For the embodiment shown in FIG. 2, the control panel has an input stage 34 for accepting input commands, a processing stage 36 for determination of and response to the received commands, and an output stage 38 to provide the drive signals to various embodiments of the control logic 22. The input stage 34 also interfaces with and is responsive to electrical signals generated by the various switch actions from a plurality of switches typically located near or on a steering column 20. The excitation for the plurality of the switches related to the steering column along with the other devices responsive to operator commands 18 may be from the power buss 14A or as will be described hereinafter with regard to FIG. 8 from a light buss such as 12A. The input stage 34 generates output signals 34A ... 34N which correspond to the active or inactive state of the commands receivable at the input stage 34. The output signals 34A ... 34N are routed to a processing stage 36.

The processing stage 36 in response to input signals 34A ... 34N generates output signals 36A ... 36N which are indicative of the commands of the various lighting devices and electrically activated devices whose operating condition is determined by the operator of the vehicle or its occupants. The output signals 36A ... 36N are routed to the output stage 38. The output stage 38 generates signals LIA ... MIN which determine the active or inactive state of all of the various electrical devices related to the present invention within the automobile. This determination may be first described with reference to Table 2.

trically activated device IA ... electrically activated device IN. Each of the vehicle electrical devices have operational states S1 and S2 which are respectively indicative of the inactive (S1) or active state (S2) of each of the related electrical devices and wherein the active states (S2) are only shown in Table 1. The interrelationship between the vehicle electrical devices and the control signals LIA ... MIN may be further described with reference to FIG. 1.

The active or inactive state of the vehicle electrical devices of FIG. 1 are determined by their inactive or active status relative to the three (3) different types of busses shown in FIG. 1, which are control buss 22I, light busses comprising 12A, 12B, 12C, and 12D, and the power buss 14A. The interrelationship between the vehicle electrical devices and the busses shown on FIG. 1 is given in Table 3.

TABLE 3

| Vehicle Electrical Device | Control Buss Device | Lighting Buss Device | Power Buss Device |
|---|---|---|---|
| Lighting Device LIA | 32 | 24 (LIA) | |
| Lighting Device LIN | 32 | 24 (LIN) | |
| Lighting Device IIA1, IIA2 | 32 | 26 (LIIA) | |
| Lighting Device IIN1, IIN2 | 32 | 26 (LIIN) | |
| Lighting Device IIIA | 32 | 26 (LIIIA) | |
| Lighting Device IIIN | 32 | 26 (LIIIN) | |
| Electrically Activated Device IA | 32 | | 30 (MIA) |
| Electrically Activated Device IN | 32 | | 30 (MIN) |

TABLE 2

| | VEHICLE ELECTRICAL DEVICES ACTIVE STATE | | | | | | | | | | | | | | |
|---|---|---|---|---|---|---|---|---|---|---|---|---|---|---|---|
| CONTROL BUSS 22I | LIGHTING DEVICE I | | | | LIGHTING DEVICE II | | | | LIGHTING DEVICE III | | | | ELECTRICALLY ACTIVATED DEVICE | | |
| CONTROL SIGNALS | A S2 | ● S2 | ● S2 | N S2 | A S2 | ● S2 | ● S2 | N S2 | A S2 | ● S2 | ● S2 | N S2 | A S2 | ● S2 | ● S2 | N S2 |
| (LIA) | X | | | | | | | | | | | | | | | |
| ● | | X | | | | | | | | | | | | | | |
| ● | | | X | | | | | | | | | | | | | |
| (LIN) | | | | X | | | | | | | | | | | | |
| (LIIA) | | | | | X | | | | | | | | | | | |
| ● | | | | | | X | | | | | | | | | | |
| ● | | | | | | | X | | | | | | | | | |
| (LIIN) | | | | | | | | X | | | | | | | | |
| (LIIIA) | | | | | | | | | X | | | | | | | |
| ● | | | | | | | | | | X | | | | | | |
| ● | | | | | | | | | | | X | | | | | |
| (LIIIN) | | | | | | | | | | | | X | | | | |
| (MIA) | | | | | | | | | | | | | X | | | |
| ● | | | | | | | | | | | | | | X | | |
| ● | | | | | | | | | | | | | | | X | |
| (MIN) | | | | | | | | | | | | | | | | X |

Table 2 illustrates the interrelationship between control signals LIA ... MIN of control buss 22I and the active state S2 of vehicle electrical devices comprising lighting device I, lighting device II, lighting device III, and electrically activated device I. Each of the vehicle electrical devices along with their related control buss, lighting buss and power buss devices are each composed of a series of similar devices classified as A through N, with N signifying the last number in any arranged series. The control signals LIA ... LIN, LIIA ... LIIN, LIIIA ... LIIIN, and MIA ... MIN respectively correspond to lighting device IA ... lighting device IN, lighting device IIA ... lighting device IIN, lighting device IIIA ... lighting device IIIN, and elec- The active or inactive state of the electrical devices of Table 3 is determined by the presence or absence of the control signals of control buss 22 shown in Table 2. For example, the presence of control signal LIA of Table 2 causes the lighting device IA of Table 3 to obtain its active or operational state S2, whereas, the presence of control signal MIN of Table 2 causes the electrically activated device IN of Table 3 to obtain its active or operational state S2. Conversely, the absence of control signals LIA and MIN respectively prevents lighting device IA and electrically activated device IN to seek or obtain their active state S2. The presence or absence of these control signals LIA ...

MIN is dependent upon the active or inactive state of the operator initiated commands 18 or the commands initiated from the external panel such as the vehicle steering column 20. The present invention contemplates various techniques for generating these control signals some of the embodiments of which are illustrated FIGS. 3, 4(a), 4(b), 6, 8(a), 8(b) and 8(c) showing four (4) separate control logic 22 mechanizations.

Figure 3:
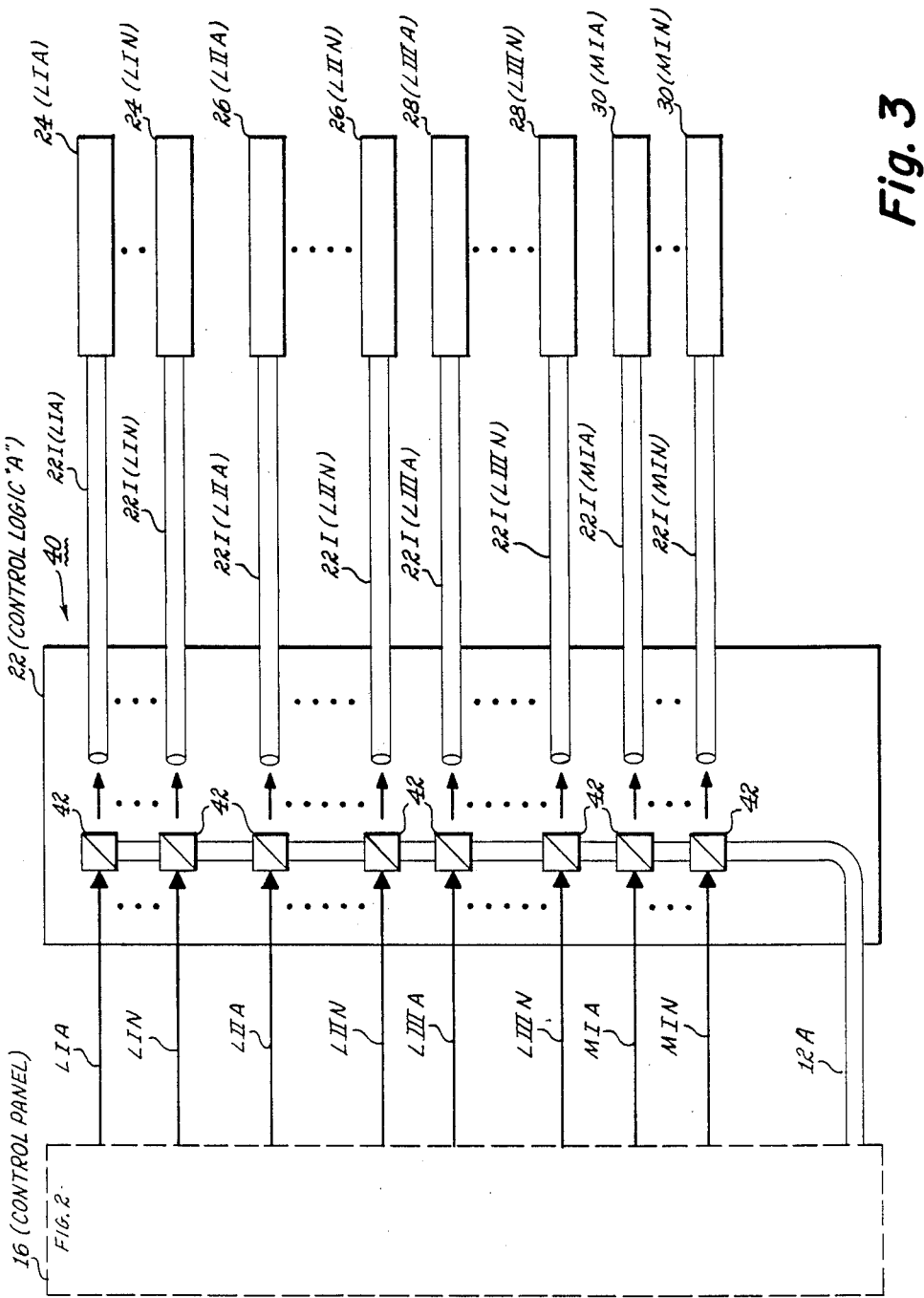
FIG. 3 is a block diagram of a first embodiment of the control logic employing a plurality of output optical fibers.

FIG. 3 illustrates an arrangement 40, included into and designated as 22 (control logic A), that comprises a plurality of optical fibers 22I(LIA) . . . 22I(MIN) for conducting light which is respectively generated in response to the output signals LIA . . . MIN of the control panel 16, which, in turn, is respectively responsive to the operator commands 18 and the signals from the steering column 20 shown in FIG. 2. The control logic A of FIG. 3 provides an optical control device 42 for each of the control signals LIA . . . MIN generated by the control panel 16. The device 42 may be comprised of optoelectronic circuits that accept an electrical signal, such as LIA, at the input stage and convert such to an optical signal i.e., 22I (LIA).

Each of the optical devices 42 may have routed to it the light present on light buss 12A. Each of the electrical output signals generated by the control panel 16 is received and converted by respectively devices 42 into an optical signals that are respectively routed to separate optical fibers 22I(LIA) . . . 22I(MIN). The respective optical fibers may be routed to the control buss devices or directly to the lighting buss devices in a manner as shown in Table 4.

TABLE 4

| Optical Fiber | Control Buss Device | Light Buss Device | Power Buss Device |
|---|---|---|---|
| 22I (LIA) | 32 (LIA) | 24 (LIA) | |
| 22I (LIN) | 32 (LIN) | 24 (LIN) | |
| 22I (LIIA) | 32 (LIIA) | 26 (LIIA) | |
| 22I (LIIN) | 32 (LIIN) | 26 (LIIN) | |
| 22I (LIIIN) | 32 (LIIIA) | 28 (LIIIA) | |
| 22I (LIIIA) | 32 (LIIIN) | 28 (LIIIN) | |
| 22I (MIA) | 32 (MIA) | | 30 (MIA) |
| 22I (MIN) | 32 (MIN) | | 30 (MIN) |

The optical control provided by the embodiment of FIG. 3 allows for the direct routing of the optical fiber into the lighting buss interface device related to the lighting device to be controlled by the light signal present on the optical fiber, thereby bypassing the need for a separate control element 32 for communicating with buss 22I. Although the embodiment of FIG. 3 eliminates the need for control elements 32, the reduction of the complexity of the wiring device related to the electrical system discussed in the "Background" section of the present invention is not reduced by an amount capable by the practice of the present invention. This limitation is removed by the embodiments shown in FIGS. 4(a), 4(b) and 6.

Figure 4A:
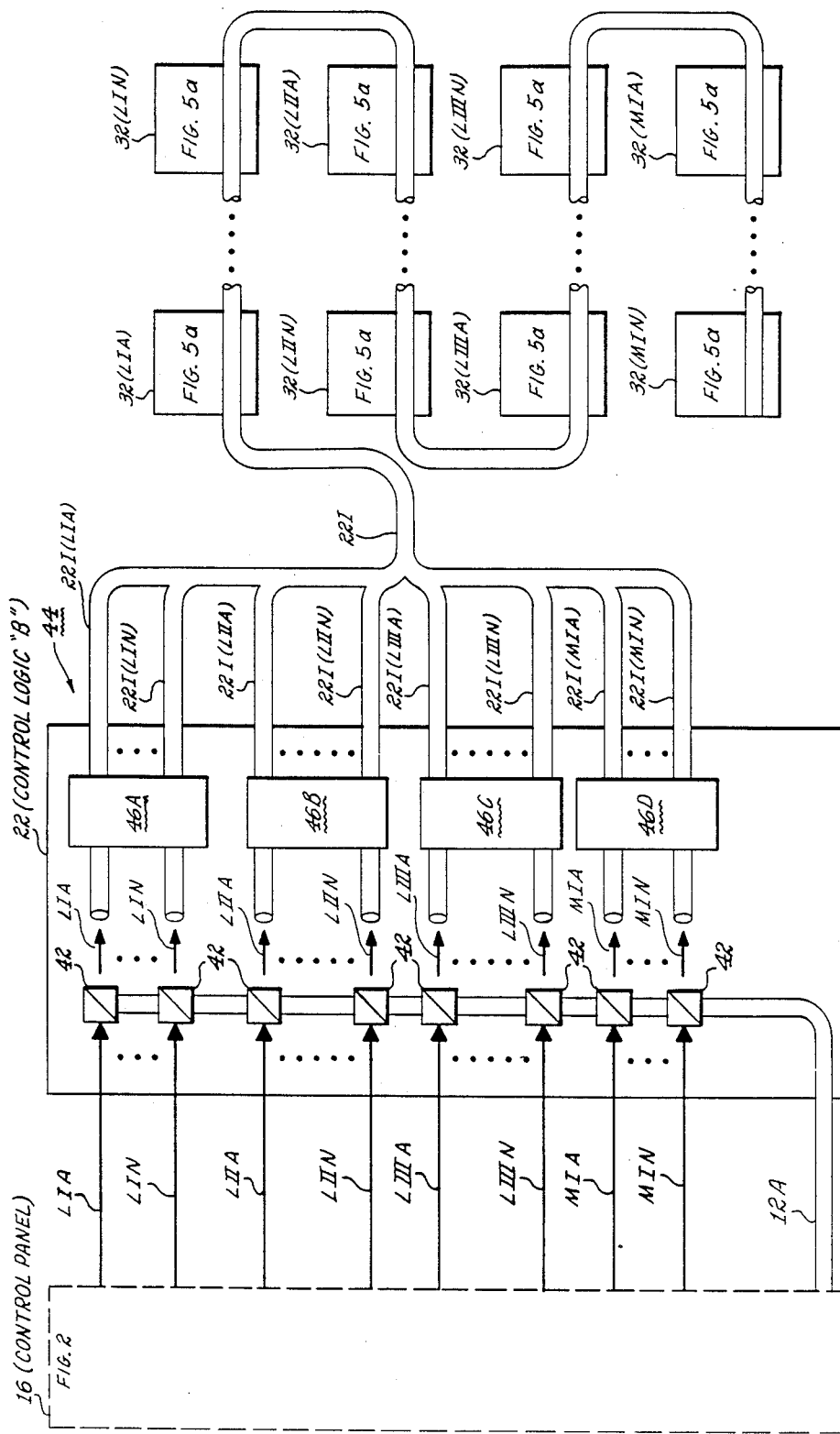
FIGS. 4(a) and 4(b) are respectively a block diagram and a schematic arrangement of another embodiment of the control logic employing color coding as a multiplexing scheme for transmission.

FIG. 4(a) illustrates an arrangement 44, included into and designated as 22 (control logic B), which has a series of light coding network 46A, 46B, 46C and 46D respectively having as their inputs the signals LIA . . . LIN, LIIA . . . LIIN, LIIIA . . . LIIIN, and MIA . . . MIN. The front end of control logic B is similar to the previously described control logic (22) in that it has a optical device 42 for accepting each of these electrical signals LIA . . . MIN and converting such electrical signals into optical signals that are routed to respective optical fibers, which, in turn are routed to the four (4) groups of color coding networks 46A, 46B, 46C, and 46D respectively. These networks 46A . . . 46D provide light signals serving as the output signals of the control logic B which are applied to the control buss 22I and are comprised of different colors. The different colors each signify a particular control signal for the control buss interface devices 32. For the embodiment shown in FIG. 4, the control buss 22I comprises a light guide that is routed to in a serial manner (shown in FIG. 4(a)) or in a parallel manner (not shown) to all of the control buss interface devices 32 given in Tables 3 and 4.

The optical signals that are present on light guide 22I are comprised of different colors so as to serve as different commanded functions. For example, the color coding network 42A may provide a blue color in response the presence of each or all of the control signals LIA . . . LIN so as to respectively command the activation of lighting device IA and/or lighting device IN. Similarly, the light coding network 46B may develop a yellow light in response to the presence of each or all of control signals LIIA . . . LIIN so as to respectively activate lighting device IIA and/or lighting device IIN. Conversely, the presence of the yellow light on light guide 22I generated by the light coding network 46B will not activate the lighting device IA, and similarly, the presence of the blue light generated by the light coding network 46A will not activate the lighting device IIA.

One of the ways to obtain the different colors is to use various filters that are to be discussed with regard to FIG. 8. Another way is shown schematically in FIG. 4(b) representative, for example, of the color coding networks 46A, in which refraction or diffraction is used to spread out light according to its color.

Figure 4B:
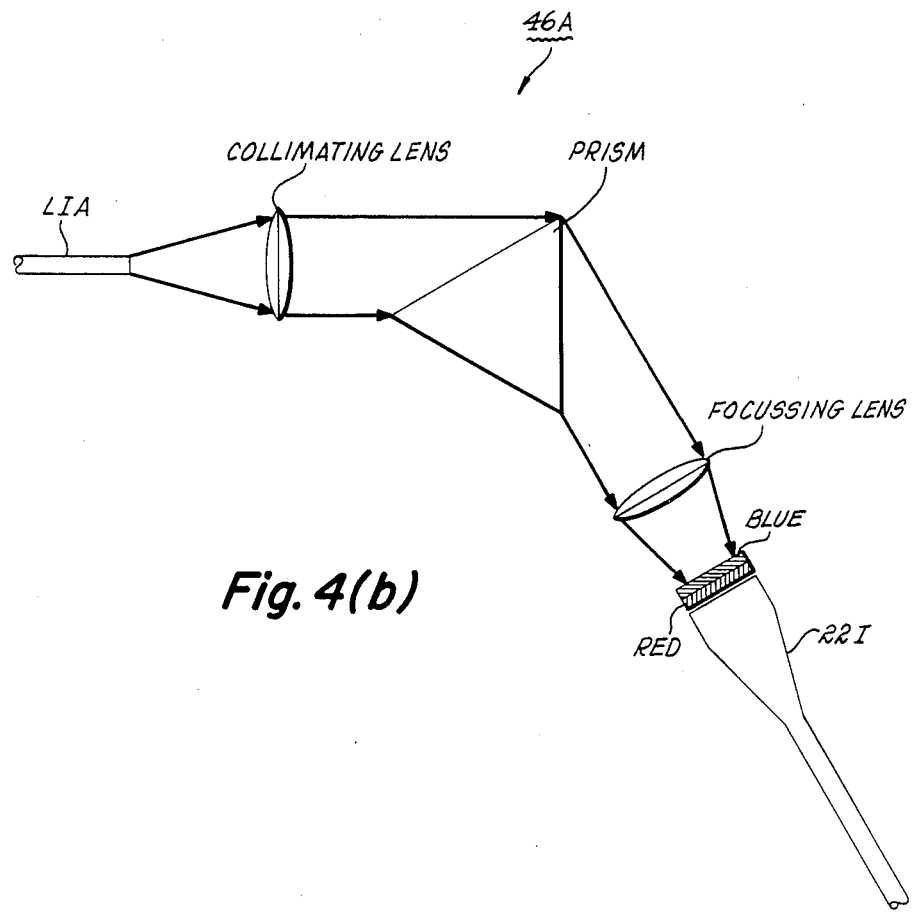

As seen in FIG. 4(b), the light rays related to LIA are emitted from an optical fiber and intercepted by a collimating lens, which, in turn, directs the intercepted light rays into a prism. The prism spreads or separates the rays according to color and directs such color rays onto a focussing lens, which, in turn, directs the rays onto at least two shutters. The shutters in their open condition allow the light rays to pass therethrough to be of selectable colors, e.g. red or blue. The light rays pass through the colored shutters and into the buss 22I for transmission to the devices of Tables 3 and 4. The arrangements of FIG. 4(a) and 4(b) allow for one common buss 22A to serve all of the needs of the electrical devices illustrated in Tables 3 and 4 and FIG. 1, and thereby reduces the complexity of the electrical wiring harness related to the vehicle in which the present invention finds application. The light generated by the various light coding networks 46A . . . 46D is decoded by the arrangements 50 shown in FIGS. 5(a) and 5(b).

FIG. 5(a) illustrates a decoding network 46A' responsive to the different light signal generated by the light coding network 46A of FIGS. 4(a) and 4(b). For the embodiment shown in FIG. 5(a), the output signal generated by coding network 46A of FIG. 4 is of a particular color that is indicative of the desired activation signal LIA that is used to energize lighting device IA. The optical decoding network 46A' accepts, for example, the blue signal generated by coding network 46 for controlling lighting device IA and responses thereto by providing an electrical signal LIA, which is routed to the lighting buss device 24 (LIA) having at its input stage an arrangement 60 of a light sensitive device and optical transistor device. For the embodiment shown in FIG. 5(a), the signal that is developed by device 46A' may be directly routed to a non-optical transistor device (not shown) of arrangement 60 and thereby eliminate the light sensitive device such as a light emitting diode that is shown for arrangement 60.

Figure 5B:
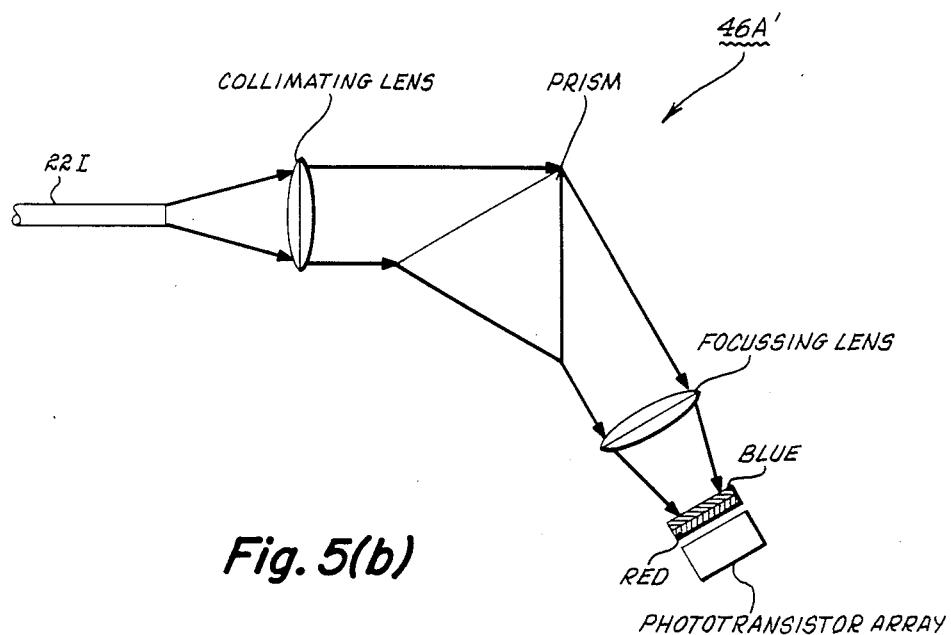

The optical decoding network 46A' may be of an arrangement shown in FIG. 5(b) which operates in a manner similar to the arrangement of FIG. 4(b) with the difference being related to the detection and response to the light rays emitted by the focussing lens. The light rays emitted by the focussing lens first pass through their related colored shutter (red or blue) and appear therefrom as white light and which is then intercepted by an array of respective phototransistor devices that are rendered conductive by the intercepted light so as to generate, for example, the signal LIA shown in FIG. 5(a).

Figure 6:
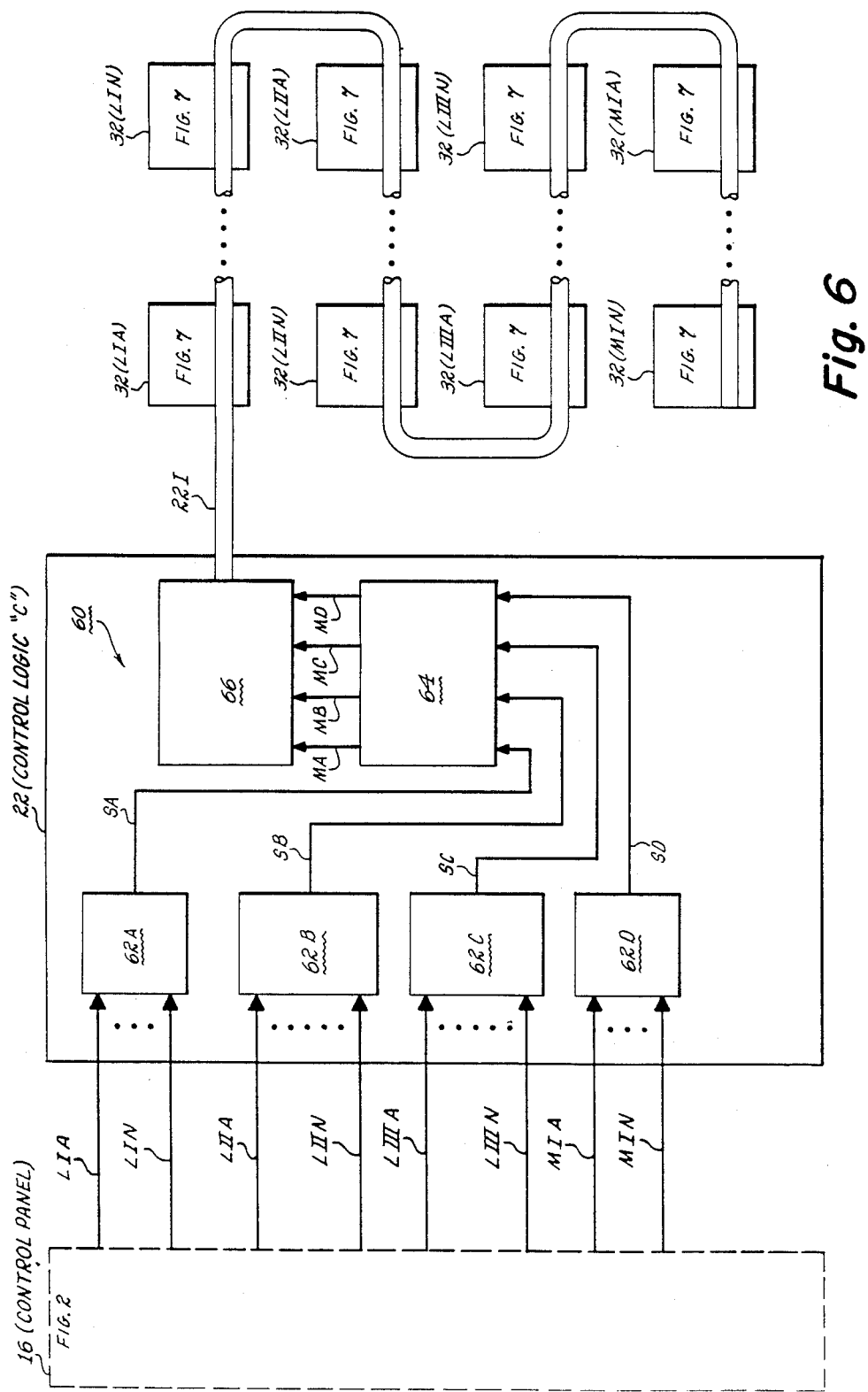
FIG. 6 is a block diagram of a further embodiment of the control logic employing light frequency coding as a multiplexing scheme for transmission.

A further embodiment for developing the control signals for activating the electrical devices of Tables 3 and 4 is shown in FIG. 6 for an arrangement 60 included in and designated as 22 (control logic C). Control logic C provides light frequency modulated signals as output signals that are applied to the control buss 22I and which are of different light frequencies each indicative of respective control signals LIA . . . MIN. Control logic C is different from control logic B in that it does not have any optical devices at its input stage, but rather directly accepts the electrical output signals generated by the control panel 16 and routes such output signals into the various groups of control signals for the embodiment of FIG. 6. For the embodiment shown in FIG. 6, the control signals LIA . . . LIN are routed to logic array 62A, control signals LIIA . . . LIIN are routed to logic array 62B, control signals LIIIA . . . LIIIN are routed to logic array 62C and control signals MIA . . . MIN are routed to logic array 62D so that the signals are grouped to four (4) separate functions with each function corresponding to a particular light frequency modulation signals. Logic arrays 62A, 62B, 62C, and 62D, respectively generate output signals SA, SB, SC and SD which, in turn, are routed to modulation device 64.

Modulating device 64 serves as a source of modulating signals that are activated or deactivated by the respective presence or absence of signals SA, SB, SC and SD, which, in turn, respectively generate signals MA, MB, MC and MD that are routed to the light frequency transmitter 66.

The light frequency transmitter 66 generates a frequency modulated light signal responsive to and indicative of one or more of the applied signals MA, MB, MC and MD. In a manner as discussed with regard to the output of control logic B, the different signals indicative of grouping of MA, MB, MC and MD activate or inactivate the electrical devices illustrated in Tables 2, 3 and 4. More particularly, groups MA, MB, MC and MD may be further segmented into MAIA . . . MAIN, MBIIA . . . MBIIN, MCIIIA . . . MCIIIN, and MDIA . . . MDIN so as to serve as the control signals of Table 2 of LIA . . . LIN, LIIA . . . LIIN, LIIIA . . . LIIIN and MIA and MIN. The light frequency modulated signals of transmitter 66 are applied to the control buss 22I which is routed to all of the control buss interface devices of Tables 3 and 4. The modulated light present in control buss 22I may be accomplished by acousto-optic, electro-optic, or magneto-optic methods, but it is preferred that such light be in the form of different radio frequency pulses generated by a light emitting diode or laser diode in the output stage of transmitter 66. The control buss interface devices related to FIG. 6 have an embodiment illustrated in FIG. 7.

Figure 7:
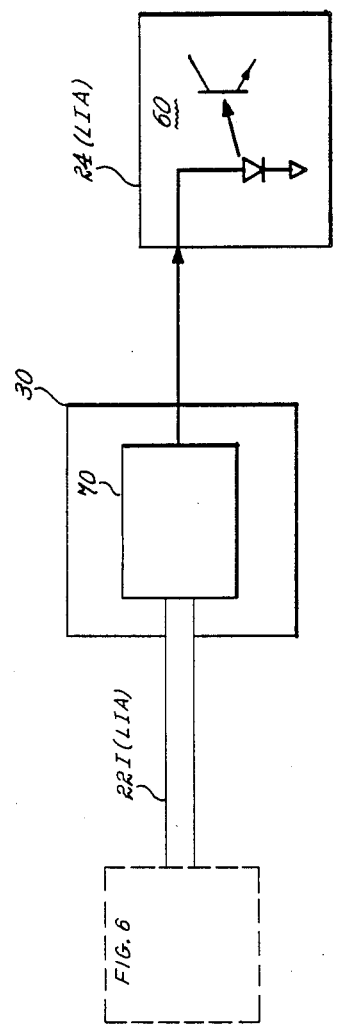
FIG. 7 is a block diagram of the control buss device related to the control logic embodiment of FIG. 6.

In a manner similar to that described with regard to FIGS. 5(a) and 5(b) relative to the control signal LIA related to lighting buss device 24LIA, FIG. 7 illustrates a frequency discriminator 70 responsive to the light frequency modulating signals MAIA generated by the control logic C of FIG. 6. For the embodiment shown in FIG. 7, the frequency discriminator 70 accepts a control signal MAIA present on control buss 22I, which is indicative of the frequency related to control signal LIA, and in response to that particular frequency, produces an electrical signal that is routed to and controls the device 24 (LIA). The frequency discriminator 70 has a tuned amplifier to detect the particular frequency related to the respective device so as to turn-on or render conductive that respective device. The detector may be of the optoelectronics art such as being a phototransistor having a related tuned amplifier.

A further embodiment of the present invention that has features similar to the light coding and decoding networks of FIGS. 4(a), 4(b), 5(a) and 5(b) is illustrated in FIG. 8 which consists of FIGS. 8(a), 8(b) and 8(c). In general, FIG. 8 shows an optical switch 18I (FIG. 8(a)) which may be used in the optical multiplexed system of the present invention. The purpose of the switch 18I is to extract light from the white light within fiber 12A which comes from the light source 12, pass it through a filter ($18I_A$ or $18I_B$ of FIG. 8(a)), and then introduce it into the other fiber which is routed to all of the lighting and electrically activated devices or other electrical devices which are to be controlled by the practice of the present invention. The filter ($18I_A$ or $18I_B$) passes light of a particular color. The electrical device which is to be controlled by the switch has a matching filter $24I_B$ (FIG. 8(c)) corresponding to filter $18I_A$ or $18I_B$ and allows the light acting as, for example, control signal LIA to pass through to the 24LIA of FIG. 8(c).

FIG. 8(a) is a top view illustrating an operator control switch 18I which may be mounted on a panel convenient to the operator such as control panel 16. The switch 18I comprises the filter member $18I_A$ which may be of a reddish color, the filter member $18I_B$ which may be of a bluish color, and a member $18I_C$ which may be opaque and which separates filters $18I_A$ and $18I_B$. The switch 18I further comprises an arm $18I_D$ which pivots in a manner as shown in phantom in FIG. 8(b). The switch 18I is shown in FIG. 8(a) as encompassing at least a portion of an optical fiber serving as the light buss 12A and another optical fiber serving as the control buss 22I.

In operation, to extract light from the first fiber 12A, fiber 12A is sharply bent as shown in the FIG. 8(a) so that light leaks from fiber 12A at the bend. If the switch 18I is in the position so that the red light is transmitted, that is, the pivot arm is moved clockwise so as to cause the fibers 12A and 22I of FIG. 8(a) to be pressed against filter $18I_A$, thereby allowing some of the light being transmitted by fiber 12A to enter the second fiber 22I, again at the bend, and which light is transmitted by fiber 22I to the device 24 (LIA) shown in FIG. 8(c). At the device 24LIA, a bend in fiber 22I allows some of the transmitted light to escape from the fiber, go through the red filter $24I_B$ to the phototransistor $24I_A$, and thereby turn-on or activate the 24LIA device. If double activation is desired, for example, the motor which drives the window up in one case and down in the other, a second phototransistor (not shown) with a blue filter is located at the bend of the fiber so as to control the drive of the motor in the opposite direction. In this way a single switch can close the window when appropriately pressed so that the red light ($18I_A$) is transmitted to the second filter $24I_B$ and the window may be opened by moving the switch so that the blue light ($18I_C$) is transmitted and responded to by an appropriate blue filter and phototransistor located within device 24 (LIA). The two sensors may be in a single device with the appropriate filter over each one.

The embodiment of FIGS. 8(a), 8(b) and 8(c) allows for the advantage of only routing four "wires" to any part of the car, for example the door. One of these wires may be for the power buss 14A which acts as the hot side of the electrical system, the second is a light guide from the light source 12 which provides whatever lighting is accomplished from the door, e.g. key hole illumination or courtesy light, the third is the light guide (fiber) from the control buss 22I (white light) used in the multiplexed control system, and the fourth is the light guide (fiber) coming from the switches 18I carrying the control signals (colored light).

For the embodiments of FIGS. 4(a), 4(b), 5(a) and 5(b) employing a light coding multiplexing system, colored filters may be employed to separate different channels of information. The colored filters need to be of a fairly narrow band in operation which is commonly termed "spike filters". To be able to use many channels of information for the embodiments of FIGS. 4(a), 4(b), 5(a) and 5(b), it is desirable that the white light be continuous, that is, to cover all of electromagnetic spectrum related to visible light rather than one or more particular color portions of the visible light spectrum. To accomplish such, a light source is preferred in which the light is produced by an incandescent filament or perhaps by a xenon discharge source rather than a metal halide lamp in which the white light consists of a mixture of many color emission lines. Alternatively, filters might be picked to match emission lines so that a mercury or metal halide lamp would be suitable. The selection of the type of light source depends on how many channels of information are needed to control all of the vehicle electrical devices shown in FIG. 1.

As shown in FIG. 8(c) with reference to device $24I_A$ and as also shown in FIGS. 5(a), 5(b) and 7 with reference to circuit arrangement 60, the lighting buss interface device 24(LIA) and also the other devices 24LIN, 26LIIA . . . 26LIIN, 28LIIIA . . . 28LIIIN and 30MIA . . . 30MIN all preferably have at their input stage an optical sensitive device each of which are activated by respective control buss interface devices 32. These devices 24, 26, 28 and 30 have different embodiments so as to serve the particular needs of their related lighting or electrically activated devices.

Figure 9A:
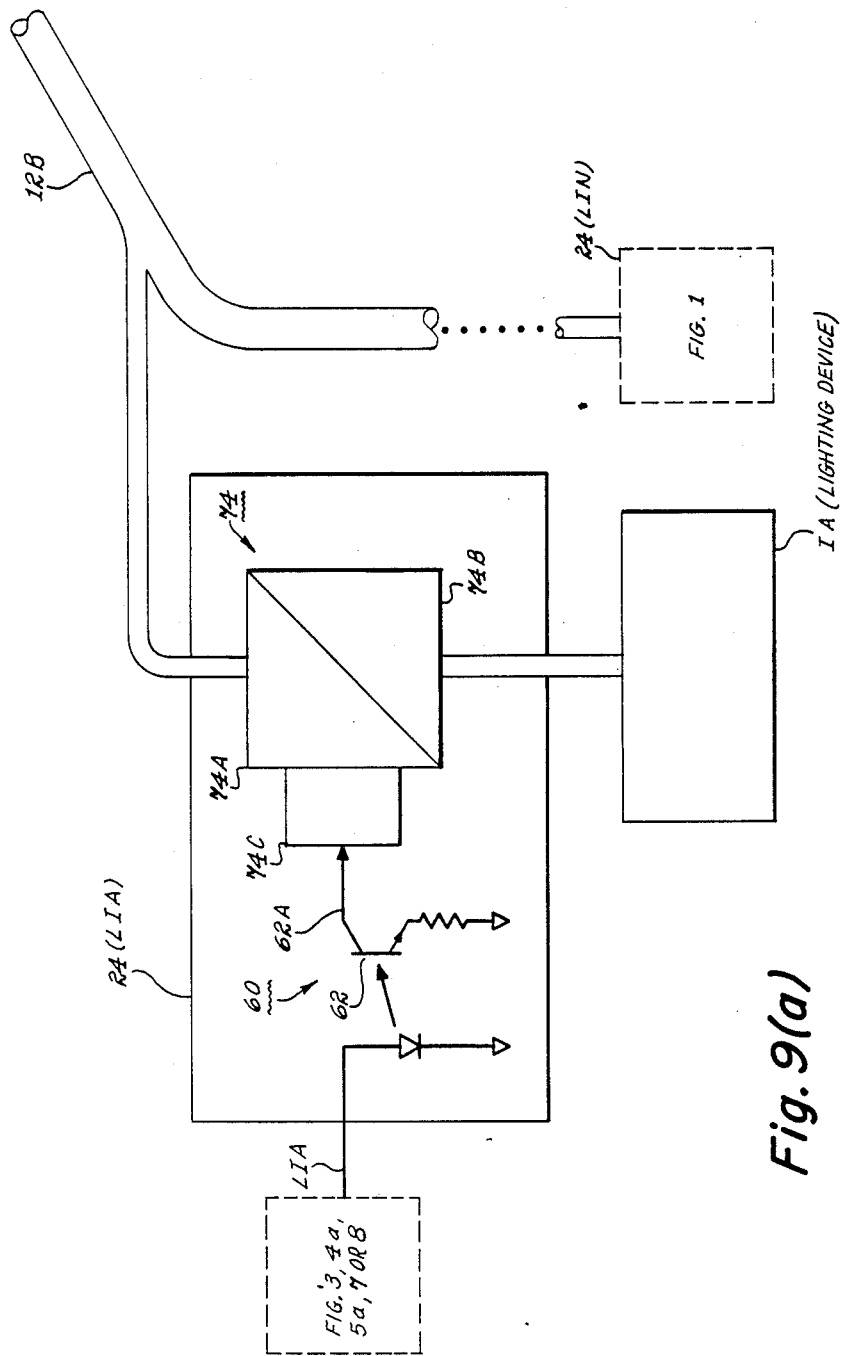
FIGS. 9(a) and 9(b) are respectively a schematic block diagram and a schematic arrangement of a first lighting buss interface device related to the present invention.

Devices 24(LIA) . . . 24(LIN) may have an embodiment illustrated in FIG. 9(a). The device 24 may comprise an optical switching network 74 shown in FIG. 9(a) as having a first or upper port 74A directly coupled to the light buss 12B and a second or lower port 74B directly coupled to the lighting device IA. The optical switching network 74 has means 74C that is responsive to the output signal 62A developed by the optical switch 62 of arrangement 60 of $24I_A$ of FIG. 8 in response to a control signal LIA from the embodiments of FIGS. 3, 4(a) and 4(b), 5(a) and 5(b), 6, 7 or 8.

Figure 9B:
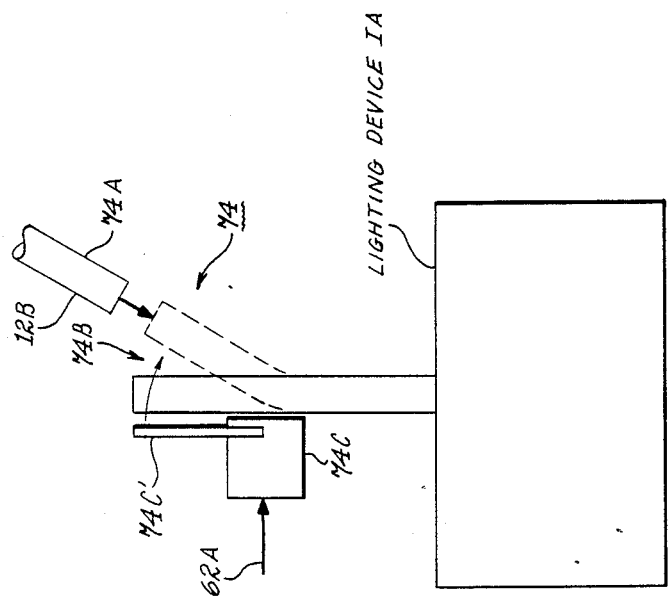

The optical switching network 74 may be comprised of an arrangement which is schematically illustrated in FIG. 9(b). The optical switching network 74 is responsive to the optical switch 62 and comprises a device which moves an optical carrying member in and out of alignment with its respective light buss. The means 74C responsive to the signal 62A may comprise a piezoelectric device having an arm 74C' that is positioned under an optical fiber serving as the output port 74B that is routed to lighting device IA. The device 74C upon receiving the signal 62A causes the arm 74C' to be moved clockwise and thereby moving fiber 74B into alignment (shown in phantom) with light buss 12B allowing the light emitted from buss 12B to enter into fiber 74B for conduction to the lighting device IA. The removal of signal 62A causes the fiber 74B to return to its at-rest position which does not allow any to the light from light buss 12B to enter into fiber 74B. The movement of fiber 74B to and from its at-rest position may be accomplish by electromagnetic, pneumatic bimetal or memory metal devices in lieu of the described piezoelectric means.

The device 24 is adapted to provide the light excitation for the lighting device IA which may have various forms, such as, a headlight or a fog light. The needs of lighting device IA are essentially that of being a device that may either be in its active or inactive state, thereby providing for the automotive needs such as high or low beam illumination. The control of the excitation, that is the active or inactive state of the lighting device IA, is determined by the presence or absence of control signal LIA. If desired, the lighting device IA may be of a flashing arrangement e.g., turn signal by allowing the periodic occurrence and removal of the control signal LIA from the device 24.

Figure 10A:
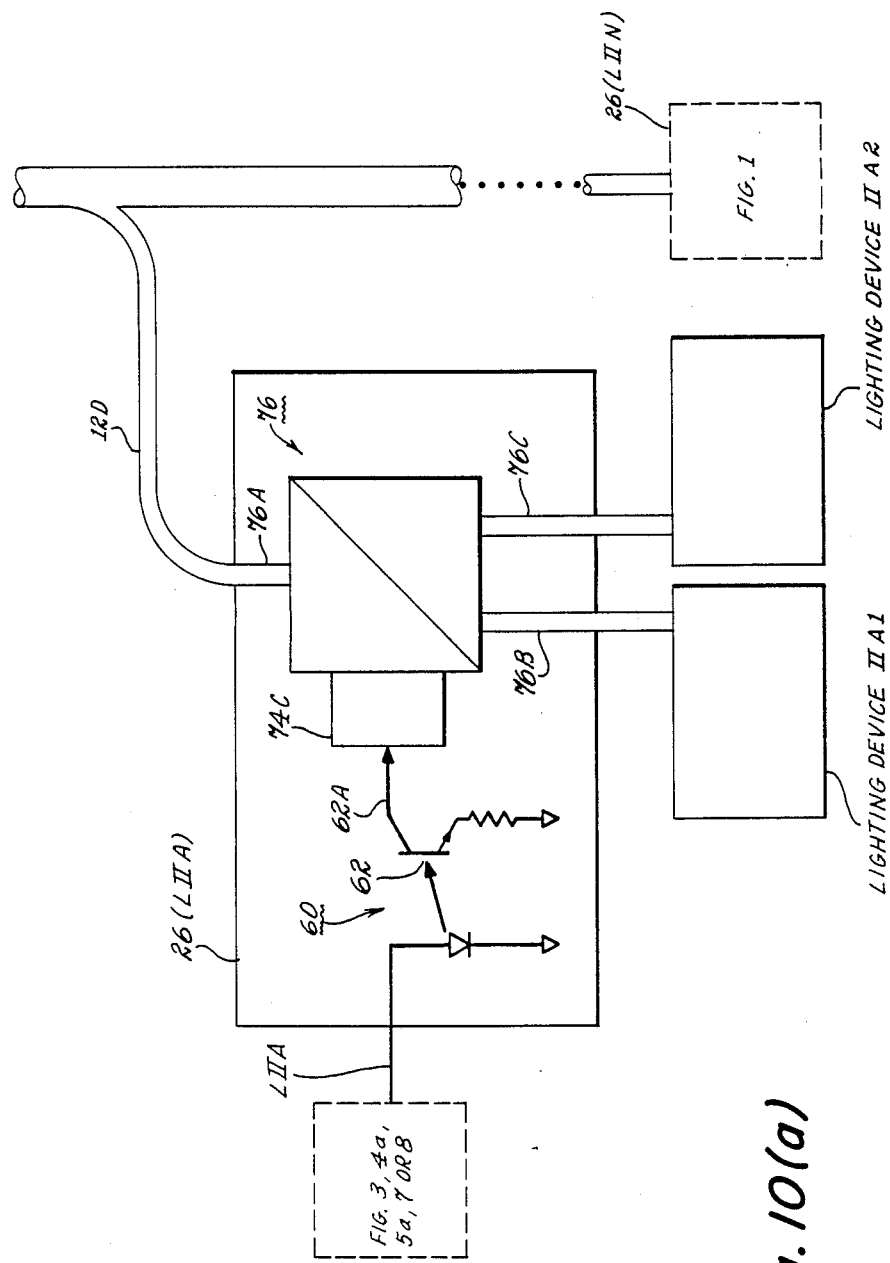

Devices 26(LIIA) . . . 26(LIIN) may be of an embodiment illustrated in FIG. 10(a). Device 26 may comprise an optical interruption network 76 having an input port 76A, two output ports 76B and 76C, and means 74C described with regard to FIG. 9(b). The first port 76A is directly coupled to light buss 12D and second port 76B and third port 76C are respectively, directly coupled to the lighting devices IIA1 and IIA2.

The optical switching network 76 may be comprised of an arrangement which is schematically illustrated in FIG. 10(b). The optical switching network 76 is responsive to said optical switch 62 and comprises a device which moves an optical carrying member in and out of alignment with the respective light buss. The device 74C upon receiving the signal 62A causes the arm 74C' to be moved counterclockwise and thereby moving fiber 76A into alignment (shown in phantom) with optical fiber 76C so as to allow the light emitted from buss 12D to enter into fiber 76C for conduction to the light device IIA1. The removal of signal 62A causes the fiber 76A to return to its at rest position which allows the light emitted from buss 12D to enter into fiber 76B for conduction to lighting device IIA2.

The device 26 adapts the lighting devices IIA1 and IIA2 to the needs of the automobile. For example, the lighting device IIA1 and IIA2 may provide for the turn signal means of the automobile. The turn signal light energy is existing within the lighting buss 12D and the flashing which indicates the turn signals function is accomplished by having the means 74C alternately couple light energy from light buss 12B into the lighting device IIA1 and then into lighting device IIA2. For this type of function, the flashing control for the lights in the front and in the rear may be alternately activated. Various means can also be used for controlling the stop-turn warning lights, so that the flashing may be done by a simple rotating mirror that alternately directs light from the front of the vehicle to the rear of the vehicle.

Figure 11A:
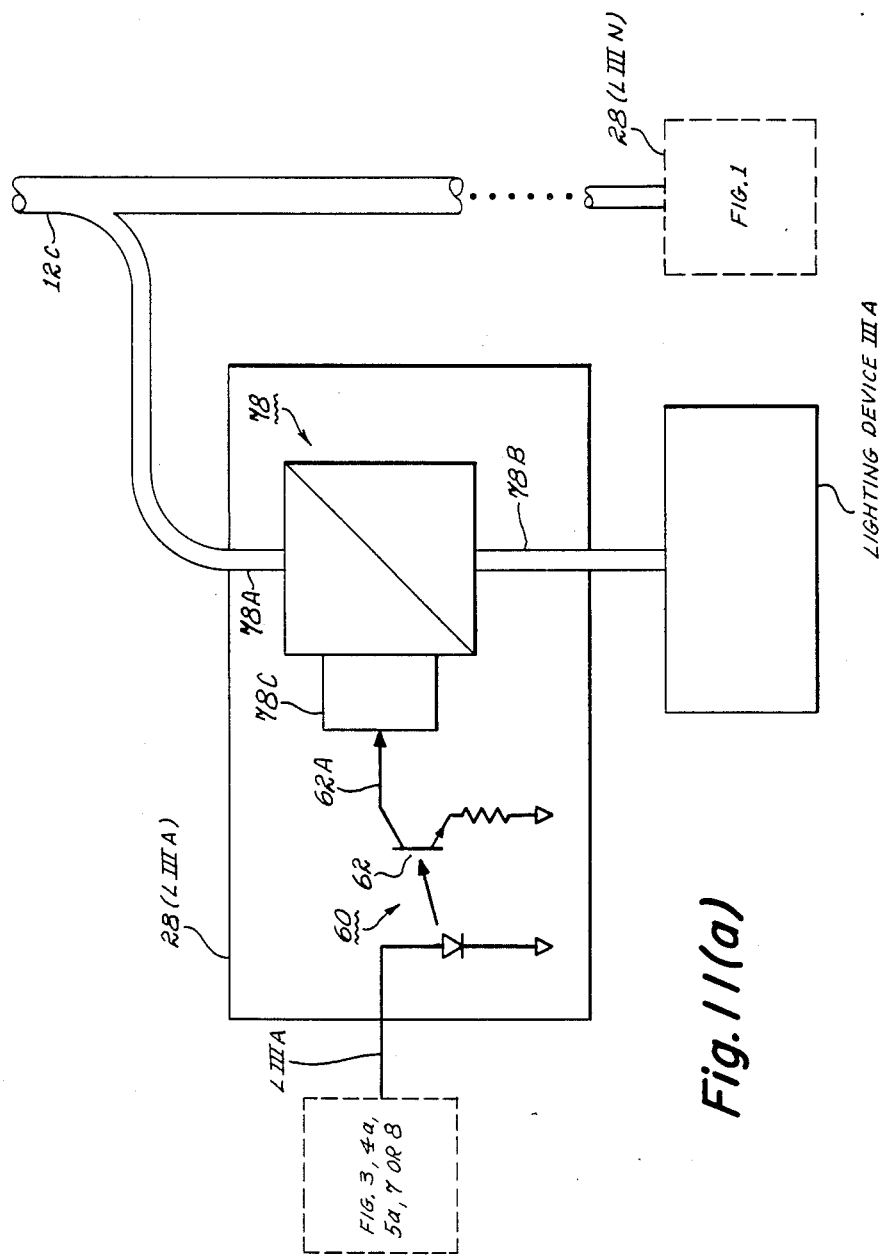
FIGS. 11(a) and 11(b) are respectively a block diagram schematic and a schematic arrangement of another lighting buss interface device related to the present invention.

Device 28(LIIIA) . . . 26(LIIIN) may have an embodiment illustrated in FIG. 11(a) and adapts the lighting device III to the needs of the automobile. The device 28 provides a light adjustment function that may find usage in the instrumentation panel of a vehicle. The device 28 illustrated in FIG. 11(a) comprises a light attenuation network 78 having a first port 78A and a second port 78B with the first port 78A being directly connected to lighting buss 12C, and the second port being directly routed to lighting device IIIA. The lighting attenuation network 78 may further have means 78C which is responsive to the signals 62A generated by the optical switch 62 so that the light conducted from the light buss 12C to the lighting device III is reduced in a variable manner from its highest condition to its lowest or a zero condition. The highest and lowest values of this light intensity may be used as a means for adjusting the illumination of the instrumentation panel or cluster in accordance to the ambient conditions of the vehicle.

Figure 11B:
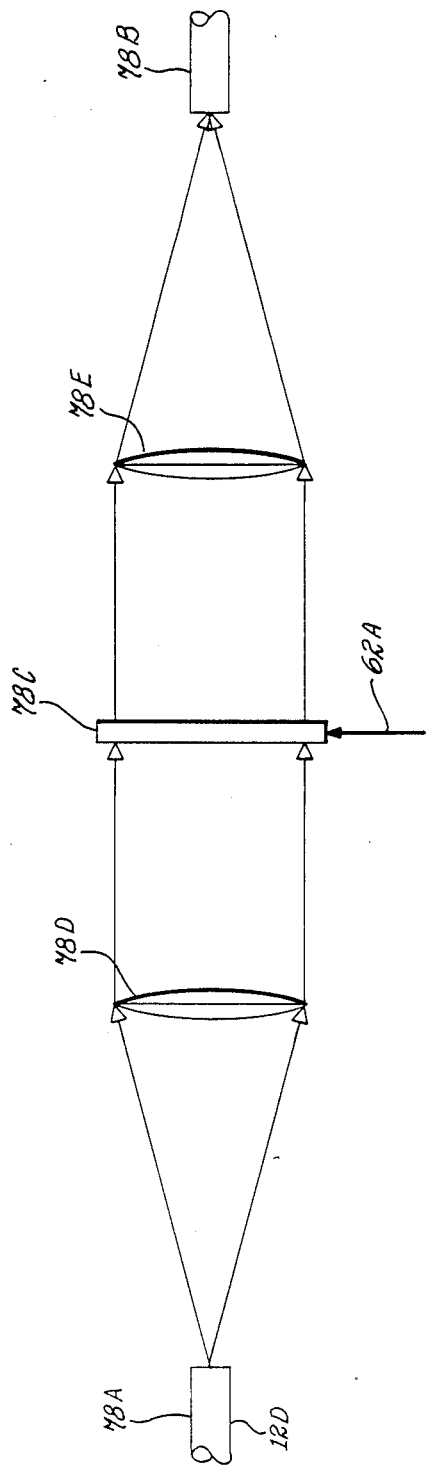

The light attenuation network 78 may be comprised of an arrangement which is schematically illustrated in FIG. 11(b). The light attenuation is primarily accomplished by means 78C that alters its transparency from substantially clear, allowing about 100% of light to pass therethrough, to substantially cloudy, allowing about 5% of light to pass therethrough, in response to the electrical signal 62A. The network 78 further comprises a colluminating lens 78D which gathers the light emitted from fiber 78A and passes such light so as to impinge unto means 78C. The means 78C performs its attenuation and passes the light unto a focussing lens 78E, which, in turn, directs the light into fiber 78B for transmittal to lighting device IIIA.

Figure 12:
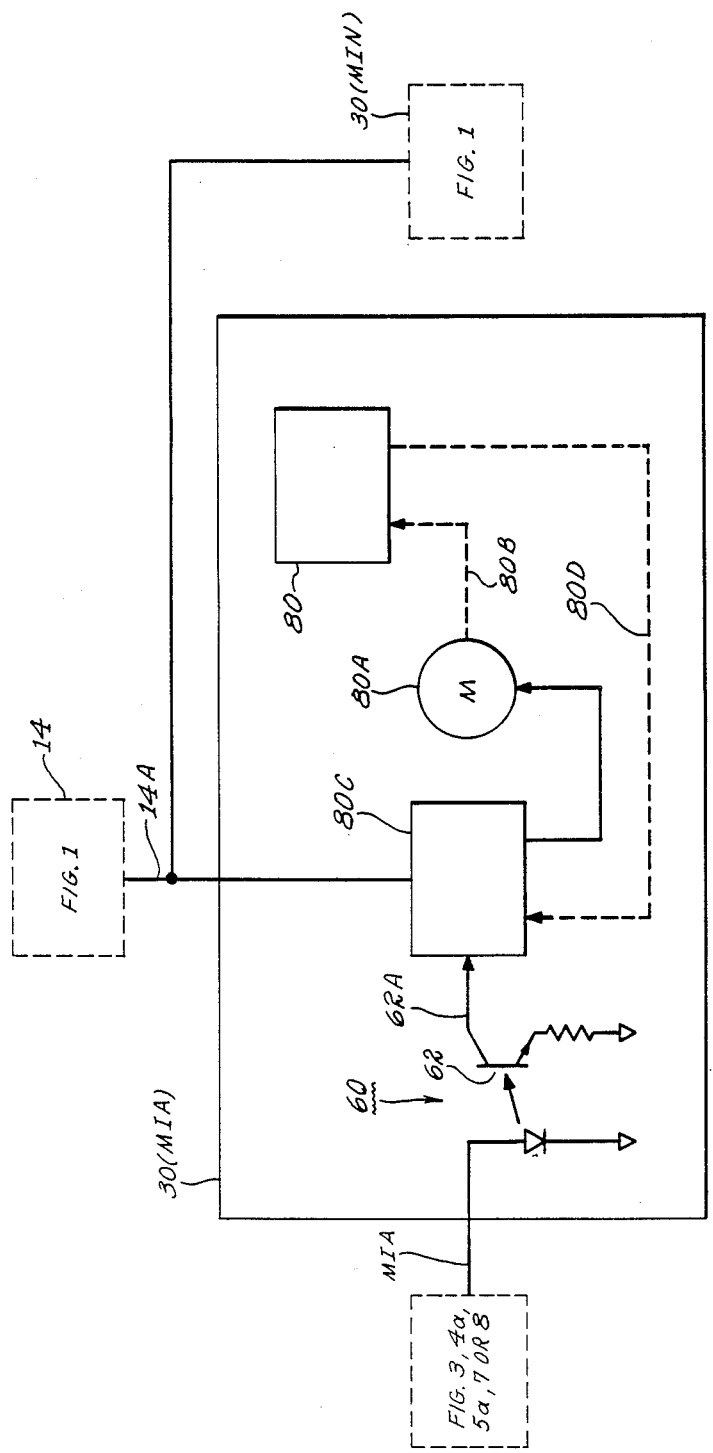
FIG. 12 is a block diagram schematic of a power buss interface device related to the present invention.

Device 30 adapts the needs of a vehicle motorized device to the control of an operator and may have an embodiment illustrated in FIG. 12. FIG. 12 generally illustrates a movable device 80 which is controlled by a motor device 80A having a gearing arrangement 80B connected to the moveable device 80. The motor device 80A is in turn controlled by a motor control 80C, which, in turn, is responsive to the output signal 62A generated by the optical device 62. The motor control 80C has one end directly connected to the power buss 14A. The motor control 80C in response to the output signal 62A causes the movement of the moveable or maneuverable device which may be a window, seat, trunk lock, door lock or other operator controlled vehicle equipment. The motor control 80C in response to a feedback path 80D terminates such movement of device 80.

It should now be appreciated that the practice of the present invention provides a means for controlling all of the lighting devices and all of the electrically activated devices operable by an occupant of a vehicle. With regard to the lighting devices, the optical energy for all of the lighting devices is developed by the light source 12, and is routed to all of the lighting devices by means of the lighting busses 12A, 12B, 12C and 12D. To selectively activate any of these devices, various methods are used such as the use of optical light coding and decoding or light frequency modulation coding and decoding or the separate use of fiber optics for selectable control of individual functions. The multiplexed distribution system of the present invention provides various embodiments that all satisfy the needs of a vehicle while at the same time reduces the electrical wiring harnesses complexity of the vehicle.

What we claim as new and desire to secure by Letters Patent of the United States is:

1. An control system for a vehicle comprising;
   (a) a light source that generates light energy for a plurality of light busses which are routed within said vehicle and provide the light energy for lighting devices;
   (b) a power source for a power buss that is routed to and provides electrical energy for electrical activation of devices of said vehicle;
   (c) at least one control panel connected to one of said light busses and responsive to a plurality of operator initiated commands for controlling said electrically activated devices and for controlling lighting devices of said vehicle, said control panel being further responsive to operator initiated commands signalling the forthcoming motion of the vehicle, said control panel generating a plurality of output signals each respectively representative of said operator initiated commands.
   (d) control logic responsive to said output signals of said control panel for generating corresponding control signals onto a control buss routed within said vehicle;
   (e) a device for respectively interfacing each of said electrically activated devices and said lighting devices with said control buss, each of said control buss interfacing devices responding to the respective output signals related to said electrically activated devices along with said lighting devices and generating an output signal in response thereto;
   (f) a device for respectively interfacing each of said lighting devices with a related light buss, each of said lighting buss interfacing devices coupling its respective lighting device to its related light buss in response to a respective output signals from said respective control buss interfacing device; and
   (g) a device for respectively interfacing each of said electrically activated devices with said power buss, each of said power buss interfacing devices coupling respective electrically activated devices to said power buss in response to a respective output signal from said respective control buss interfacing device.

2. A control system for a vehicle according to claim 1 wherein said light source comprises;
   a gas discharge high intensity light source having a spherical shape and a plurality of light guides merged into its outer surface, said plurality of light guides having respectively connected thereto a plurality of optical light carrying devices serving as said light busses.

3. A control system for a vehicle according to claim 1 wherein said light source comprises;
   an incandescent light source having a plurality of light guides merged into its outer surface, said plurality of light guides having respectively connected thereto a plurality of optical light carrying devices serving as said light busses.

4. A control system for a vehicle according to claim 1 wherein said control panel comprises;
   (a) optical switches having an excitation supplied from said one of said light busses and being responsive to said plurality of operator initiated commands for controlling the operating state of said electrically activated devices and said lighting devices.

5. A control system for a vehicle according to claim 1 wherein said control logic comprises;
   (a) plurality of optical fibers for conducting light and having one end respectively connected to each of the output signals of said control panel with their other end serving as said control buss and being connected to respective said light buss interfacing device and to respective said power buss interfacing device.

6. A control system for a vehicle according to claim 1 wherein said control buss comprises a light guide that is routed to all of said control buss interfacing devices.

7. A electrical transmission system for a vehicle according to claim 6 wherein said control logic comprises;
   (a) a light coding network having as inputs said output signals of said control panel, said coding network providing light signals serving as said output signals of said control logic and being applied to said light guide control buss, said coding network light signals being segmented into different colors to indicate different functions.

8. A control system for a vehicle according to claim 1 wherein said control logic comprises;
   (a) a coding network having as inputs said output signals of said control panel, said coding network providing light frequency modulated signals serving as output signals and applied to said control buss, said network output signals being light modulated at different frequencies to indicate different functions.

9. A control system for a vehicle according to claim 7 wherein said control buss interfacing device comprises;
   a decoding network responsive to said light signals of said coding network and decoding said different colors to correspond to and provide an electrical signal to selectively activate respective said light buss interfacing devices and said power buss interfacing devices.

10. An electrical transmission system for a vehicle according to claim 8 wherein said control buss interfacing device comprises;
    a frequency discriminator responsive to said light frequency modulated signals of said coding network and decoding said light frequency modulated signals to correspond to and provide an electrical signal to selectively active respective said light buss interfacing devices and said power buss interfacing devices.

11. A control for a vehicle according to claim 5 wherein each of said light buss interfacing devices and said power buss interfacing devices have an input stage with an optical switch responsive to a light signal generated by respective said optical fiber.

12. A control system for a vehicle according to claim 9 wherein each of said light buss interfacing devices and said power buss interfacing devices have an input stage with an optical switch responsive to said electrical signal generated by respective said decoding network of said control buss interfacing network.

13. A control system for a vehicle according to claim 10 wherein each of said light buss interfacing devices and said power buss interfacing devices have an input stage with an optical switch responsive to said electrical signal generated by respective said decoding network of said control buss interfacing network.

14. A control system according to claim 11 wherein said light buss interfacing device comprises;
    (a) an optical switching network having one end directly coupled to one of said plurality of light busses and its other end directly coupled to one of said lighting device, said optical switching network being responsive to said optical switch to direct the light that may be present on said respective light buss into said lighting device.

15. A control system according to claim 12 wherein said light buss interfacing device comprises;
    (a) an optical switching network having one end directly coupled to one of said plurality of light busses and its other end directly coupled to one of said lighting device, said optical switching network being responsive to said optical switch to direct the light that may be present on said respective light buss into said lighting device.

16. A control system according to claim 13 wherein said light buss interfacing device comprises;
    (a) an optical switching network having one end directly coupled to one of said plurality of light busses and its other end directly coupled to one of said lighting device, said optical switching network being responsive to said optical switch to direct the light that may be present on said respective light buss into said lighting device.

17. A control system according to claim 16 wherein said optical switching network responsive to said optical switch comprises a device which moves an optical carrying member in and out of alignment with said respective light buss.

18. A control system according to claim 11 wherein said light buss interfacing device comprises;
    (a) an optical interruption network having three (3) ports with the first being directly coupled to one of said plurality of light busses and the second and third ports being directly coupled to one of said lighting device, said interrupt network further having means to connect and then disrupt the interconnection of said first and second ports and said first and third ports.

19. A control system according to claim 18 wherein said means for connecting and then disrupting said interconnection is responsive to said optical switch and comprises a device which moves an optical carrying member in and out of alignment with said respective light buss.

20. A control system according to claim 12 wherein said light buss interfacing device comprises;
    (a) an optical interruption network having three (3) ports with the first being directly coupled to one of said plurality of light busses and the second and third ports being directly coupled to one of said lighting device, said interrupt network further having means to connect and then disrupt the interconnection of said first and second ports and said first and third ports.

21. A control system according to claim 13 wherein said light buss interfacing device comprises;
    (a) an optical interruption network having three (3) ports with the first being directly coupled to one of said plurality of light busses and the second and third ports being directly coupled to one of said lighting device, said interrupt network further having means to connect and then disrupt the interconnection of said first and second ports and said first and third ports.

22. A control system according to claim 11 wherein said light buss interfacing device comprises;
  (a) a light attenuating network having a first and a second port with the first port being directly coupled to one of said plurality of light busses and said second port being directly coupled to one of said lighting devices, said light attenuating network further having means responsive to said optical switch so that the light conducted from said light buss to said lighting device is reduced in a variable manner from a high value to a low value.

23. A control system according to claim 12 wherein said light buss interfacing device comprises;
  (a) a light attenuating network having a first and a second port with the first port being directly coupled to one of said plurality of light busses and said second port being directly coupled to one of said lighting devices, said light attenuating network further having means to be responsive to said optical switch so that the light conducted from said light buss to said lighting device is reduced in a variable manner.from a high value to a low value.

24. A control system according to claim 13 wherein said light buss interfacing device comprises;
  (a) a light attenuating network having a first and a second port with the first port being directly coupled to one of said plurality of light busses and said second port being directly coupled to one of said lighting devices, said light attenuating network further having means to be responsive to said optical switch so that the light conducted from said light buss to said lighting device is reduced in a variable manner from a high value to a low value.

25. A control system according to claim 11 wherein said power buss interfacing device comprises;
  (a) a motorized mechanism responsive to an operator of said vehicle, said motorized mechanism having one side directly connected to said power buss and another side connected to a gearing arrangement coupled to said electrically activated device, said motorized mechanism further having means responsive to said optical switch causing the movement and termination of such movement of said electrically activated device.

26. A control system according to claim 12 wherein said power buss interfacing device comprises;
  (a) a motorized mechanism responsive to an operator of said vehicle, said motorized mechanism having one side directly connected to said power buss and another side connected to a gearing arrangement coupled to said electrically activated device, said motorized mechanism further having means responsive to said optical switch causing the movement and termination of such movement of said electrically activated device.

27. An electrical transmission system according to claim 13 wherein said power buss interfacing device comprises;
  (a) a motorized mechanism responsive to an operator of said vehicle, said motorized mechanism having one side directly connected to said power buss and another side connected to a gearing arrangement coupled to said electrically activated device, said motorized mechanism further having means responsive to said optical switch causing the movement and termination of such movement of said electrically activated device.

28. A control system according to claim 5 wherein said optical switching network responsive to said optical switch comprises a device which moves an optical carrying member in and out of alignment with said respective light buss.

29. A control system for a vehicle according to claim 8 wherein said light source comprises;
  a gas discharge high intensity light source having a spherical shape and a plurality of light guides merged into its outer surface, said plurality of light guides having respectively connected thereto a plurality of optical light carrying devices serving as said light busses.

30. A control system for a vehicle according to claim 8 wherein said light source comprises;
  an incandescent light source having a plurality of light guides merged into its outer surface, said plurality of light guides having respectively connected thereto a plurality of optical light carrying devices serving as said light busses.

31. A control system for a vehicle according to claim 8 wherein said control panel comprises;
  (a) optical switches having an excitation supplied from said one of said light busses and being responsive to said plurality of operator initiated commands for controlling the operating state of said electrically activated devices and said lighting devices.

32. A control system for a vehicle according to claim 6 wherein said light source comprises;
  a gas discharge high intensity light source having a spherical shape and a plurality of light guides merged into its outer surface, said plurality of light guides having respectively connected thereto a plurality of optical light carrying devices serving as said light busses.

33. A control system for a vehicle according to claim 6 wherein said light source comprises;
  an incandescent light source having a plurality of light guides merged into its outer surface, said plurality of light guides having respectively connected thereto a plurality of optical light carrying devices serving as said light busses.

34. A control system for a vehicle according to claim 6 wherein said control panel comprises;
  (a) optical switches having an excitation supplied from said one of said light busses and being responsive to said plurality of operator initiated commands for controlling the operating state of said electrically activated devices and said lighting devices.

35. A control system according to claim 6 wherein said optical switching network responsive to said optical switch comprises a device which moves an optical carrying member in and out of alignment with said respective light buss.

36. A control system according to claim 6 wherein said light buss interfacing device comprises;
  (a) an optical interruption network having three (3) ports with the first being directly coupled to one of said plurality of light busses and the second and third ports being directly coupled to one of said lighting device, said interrupt network further having means to connect and then disrupt the interconnection of said first and second ports and said first and third ports.

* * * * *